US009387512B2

(12) United States Patent
Lee et al.

(10) Patent No.: US 9,387,512 B2
(45) Date of Patent: Jul. 12, 2016

(54) SLURRY-BASED COATING RESTORATION

(71) Applicant: Rolls-Royce Corporation, Indianapolis, IN (US)

(72) Inventors: Kang N. Lee, Zionsville, IN (US); Adam Lee Chamberlain, Mooresville, IN (US); Andrew Joseph Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 112 days.

(21) Appl. No.: 14/213,466

(22) Filed: Mar. 14, 2014

(65) Prior Publication Data
US 2014/0272249 A1 Sep. 18, 2014

Related U.S. Application Data

(60) Provisional application No. 61/801,271, filed on Mar. 15, 2013.

(51) Int. Cl.
*B05D 5/00* (2006.01)
*C04B 41/85* (2006.01)
(Continued)

(52) U.S. Cl.
CPC .............. *B05D 5/005* (2013.01); *C04B 41/009* (2013.01); *C04B 41/50* (2013.01); *C04B 41/85* (2013.01); *F01D 5/005* (2013.01); *C04B 2111/72* (2013.01); *F01D 5/288* (2013.01); *Y10T 428/20* (2015.01)

(58) Field of Classification Search
CPC ....................................................... B05D 5/005

USPC ......................................................... 427/140
See application file for complete search history.

(56) References Cited

U.S. PATENT DOCUMENTS 3,859,061 A  1/1975  Speirs et al.
3,962,059 A  6/1976  Kaup et al.
(Continued)

FOREIGN PATENT DOCUMENTS

DE   102007050141 A1   4/2009
EP       1010774 A1    6/2000
(Continued)

OTHER PUBLICATIONS

Examiners Answer from U.S. Appl. No. 12/750,971, dated Sep. 30, 2014, 9 pp.
(Continued)

*Primary Examiner* — Brent O'Hern
(74) *Attorney, Agent, or Firm* — Shumaker & Sieffert, P.A.

(57) ABSTRACT

In some examples, a method includes identifying a damaged area in a ceramic matrix composite coating of an in-service component; applying a restoration slurry to the damaged area of the ceramic matrix composite coating, wherein the restoration slurry comprises a liquid carrier and a restoration coating material; drying the restoration slurry to form a dried restoration slurry; and heat treating the dried restoration slurry to form a restored portion of the ceramic matrix composite coating. In some examples, an assembly may include a component including a substrate and a coating on the substrate, where the coating defines a damaged portion; masking around the damaged portion on undamaged portions of the coating; and a restoration slurry in the damaged portion, wherein the restoration slurry comprises a liquid carrier and a restoration coating material.

13 Claims, 3 Drawing Sheets

(51) Int. Cl.
*C04B 41/00* (2006.01)
*C04B 41/50* (2006.01)
*F01D 5/00* (2006.01)
F01D 5/28 (2006.01)
C04B 111/72 (2006.01)

(56) References Cited

U.S. PATENT DOCUMENTS

| | | | |
|---|---|---|---|
| 4,031,274 A | 6/1977 | Bessen | |
| 4,132,816 A | 1/1979 | Benden et al. | |
| 4,148,275 A | 4/1979 | Benden et al. | |
| 4,347,267 A | 8/1982 | Baldi | |
| 4,358,480 A * | 11/1982 | Ecord | B05D 5/005 244/159.1 |
| 4,501,766 A | 2/1985 | Suzuki et al. | |
| 4,965,095 A | 10/1990 | Baldi | |
| 5,041,309 A | 8/1991 | Davis et al. | |
| 5,057,196 A | 10/1991 | Creech et al. | |
| 5,071,678 A | 12/1991 | Grybowski et al. | |
| 5,217,757 A | 6/1993 | Milaniak et al. | |
| 5,334,417 A | 8/1994 | Rafferty et al. | |
| 5,355,668 A | 10/1994 | Weil et al. | |
| 5,366,765 A | 11/1994 | Milaniak et al. | |
| 5,683,825 A | 11/1997 | Bruce et al. | |
| 5,807,428 A | 9/1998 | Bose et al. | |
| 5,824,366 A | 10/1998 | Bose et al. | |
| 5,958,204 A | 9/1999 | Creech et al. | |
| 5,976,337 A | 11/1999 | Korinko et al. | |
| 5,997,604 A | 12/1999 | Rafferty et al. | |
| 6,045,863 A | 4/2000 | Olson et al. | |
| 6,110,262 A | 8/2000 | Kircher et al. | |
| 6,180,170 B1 | 1/2001 | Grossmann et al. | |
| 6,235,352 B1 | 5/2001 | Leverant et al. | |
| 6,273,678 B1 | 8/2001 | Darolia | |
| 6,294,261 B1 | 9/2001 | Sangeeta et al. | |
| 6,332,926 B1 | 12/2001 | Pfaendtner et al. | |
| 6,406,561 B1 | 6/2002 | Creech et al. | |
| 6,485,848 B1 | 11/2002 | Wang et al. | |
| 6,497,920 B1 | 12/2002 | Pfaendtner et al. | |
| 6,533,875 B1 | 3/2003 | Pfaendtner et al. | |
| 6,586,052 B2 | 7/2003 | Creech et al. | |
| 6,613,445 B2 | 9/2003 | Sangeeta et al. | |
| 6,616,969 B2 | 9/2003 | Pfaendtner et al. | |
| 6,730,179 B2 | 5/2004 | Kircher | |
| 6,827,969 B1 | 12/2004 | Skoog et al. | |
| 6,989,174 B2 | 1/2006 | Heng et al. | |
| 7,056,555 B2 | 6/2006 | Bauer et al. | |
| 7,509,735 B2 | 3/2009 | Philip et al. | |
| 7,588,797 B2 | 9/2009 | Skoog et al. | |
| 7,842,335 B2 | 11/2010 | Skoog et al. | |
| 2003/0044536 A1 | 3/2003 | Rigney et al. | |
| 2003/0211242 A1 | 11/2003 | Shah | |
| 2004/0229075 A1 | 11/2004 | Gleeson et al. | |
| 2006/0127695 A1 | 6/2006 | Gleeson et al. | |
| 2007/0207330 A1 | 9/2007 | Tulyani et al. | |
| 2009/0004427 A1 | 1/2009 | Sarrafi-Nour et al. | |
| 2009/0162684 A1 | 6/2009 | Creech | |
| 2010/0086680 A1 | 4/2010 | Creech et al. | |
| 2011/0027467 A1 | 2/2011 | Kirby et al. | |
| 2011/0027469 A1 | 2/2011 | Kirby et al. | |
| 2011/0027470 A1 | 2/2011 | Kirby et al. | |
| 2011/0027476 A1 | 2/2011 | Kirby et al. | |
| 2011/0027484 A1 | 2/2011 | Kirby et al. | |
| 2011/0027517 A1 | 2/2011 | Kirby et al. | |
| 2011/0027556 A1 | 2/2011 | Kirby et al. | |
| 2011/0027557 A1 | 2/2011 | Kirby et al. | |
| 2011/0027558 A1 | 2/2011 | Kirby et al. | |
| 2011/0027559 A1 | 2/2011 | Kirby et al. | |
| 2011/0027578 A1 | 2/2011 | Kirby et al. | |

FOREIGN PATENT DOCUMENTS

| | | |
|---|---|---|
| EP | 1088908 A2 | 4/2001 |
| EP | 1251191 A1 | 10/2002 |
| EP | 1609885 A1 | 12/2005 |
| EP | 1462537 A2 | 4/2008 |
| EP | 1978210 A1 | 10/2008 |
| WO | 0105579 A2 | 1/2001 |
| WO | 2009085188 A1 | 7/2009 |

OTHER PUBLICATIONS

Chen, "Slurry development for the deposition of a GdSiO4+Mullite environmental barrier coating on silicon carbide," Journal of Ceramic Processing Research, vol. 8, No. 2, pp. 142-144, 2007.

International Preliminary Report on Patentability from counterpart International Application No. PCT/US2014/028848, mailed Sep. 24, 2015, 9 pp.

International Search Report and Written Opinion of counterpart international application No. PCT/US2014/028848, mailed Jul. 22, 2014, 11 pp.

Prosecution History from U.S. Appl. No. 12/750,971, dated Jun. 20, 2012, through Jun. 30, 2014, 100 pp.

Reply Brief from U.S. Appl. No. 12/750,971, filed Nov. 25, 2014, 10 pp.

* cited by examiner

SLURRY-BASED COATING RESTORATION

This application claims the benefit of U.S. Provisional Application No. 61/801,271, filed Mar. 15, 2013, which is incorporated herein by reference in its entirety.

TECHNICAL FIELD

The disclosure describes slurry-based coating techniques.

BACKGROUND

In some technological areas, mechanical structures and components are exposed to high temperatures and environmental conditions that may lead to material degradation or damage. For example, certain mechanical structures and components associated with gas turbine engines are subjected to very high temperatures and harsh environmental conditions, particularly in the combustion section and at the turbine inlet section. Such structures and components include, but are not limited to, blades, vanes, blade tracks, and combustor liners. Improvements in efficiency and reductions in emissions have driven increased demands for higher gas turbine inlet temperatures, which in turn require technological improvements in cooling, materials, and coatings to achieve higher inlet temperatures. Due to intrinsic limitations in the material properties and performance characteristics of high temperature metallic materials such as Ni-based superalloys, emphasis has shifted to the use of next generation high temperature materials such as, for example, silicon-based ceramic materials.

Although silicon-based ceramic materials exhibit desirable high temperature mechanical, physical and chemical properties, such materials can suffer from rapid recession in combustion environments due to volatilization of silica scale by water vapor. Therefore, protective coatings are used to protect the silicon-based ceramics from volatilization caused by water vapor present in the hot combustion gases. Such coatings are commonly referred to as environmental barrier coatings (EBC).

SUMMARY

In some examples, the disclosure describes a method including identifying a damaged area in a ceramic matrix composite coating of an in-service component; applying a restoration slurry to the damaged area of the ceramic matrix composite coating, wherein the restoration slurry comprises a liquid carrier and a restoration coating material; drying the restoration slurry to form a dried restoration slurry; and heat treating the dried restoration slurry to form a restored portion of the ceramic matrix composite coating.

In some examples, the disclosure describes an assembly including a component including a substrate and a coating on the substrate, where the coating defines a damaged portion; masking around the damaged portion on undamaged portions of the coating; and a restoration slurry in the damaged portion, wherein the restoration slurry comprises a liquid carrier and a restoration coating material.

The details of one or more examples are set forth in the accompanying drawings and the description below. Other features, objects, and advantages will be apparent from the description and drawings, and from the claims.

DETAILED DESCRIPTION

Figure 1:
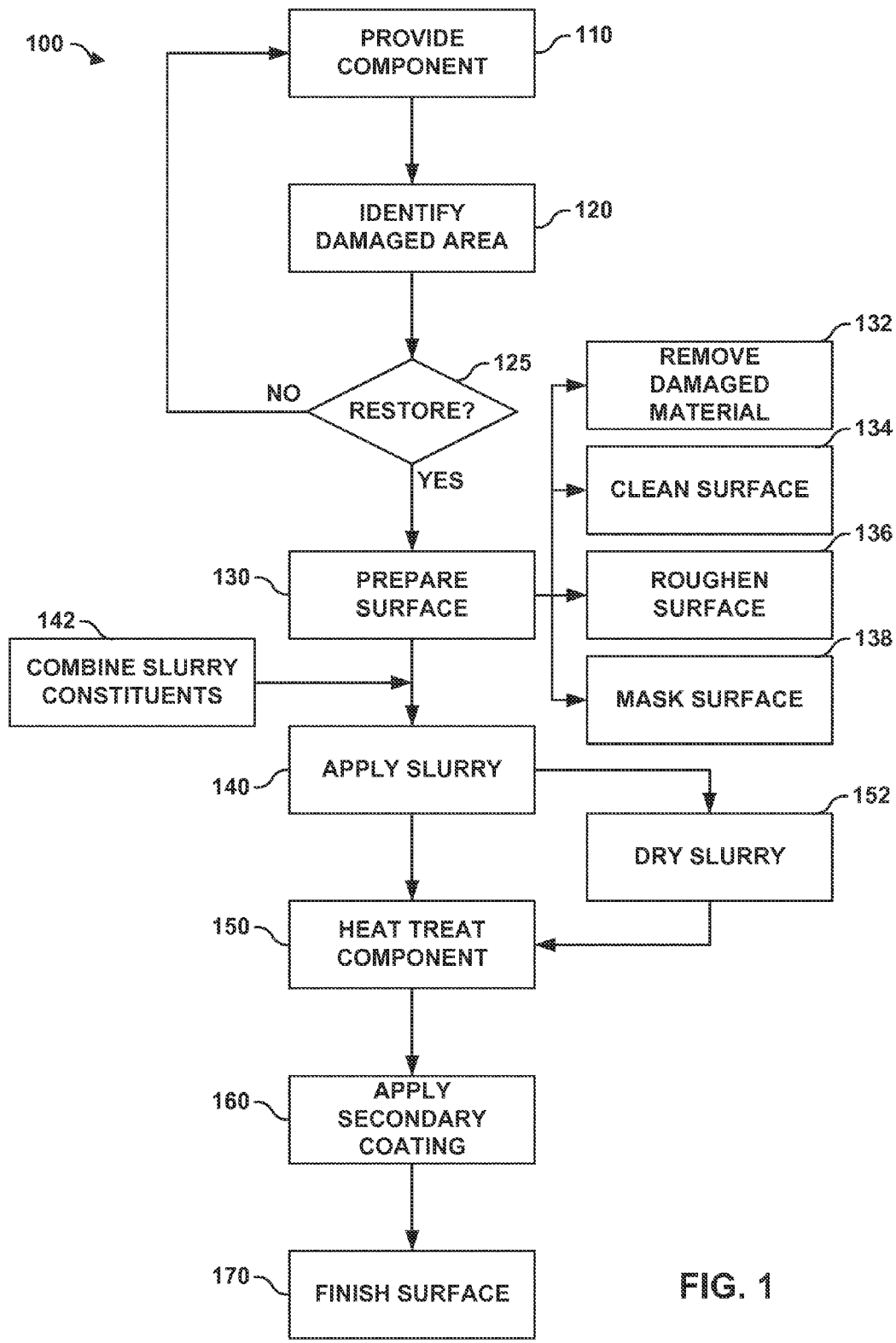
FIG. 1 is a flow diagram of an example restoration coating technique in accordance with some examples of the present disclosure.

FIG. 1 is a flow diagram illustrating an example a restoration coating technique 100 of the present disclosure. Restoration coating technique 100 includes providing an in-service component (110); identifying a damage area of a substrate coating (120); preparing the damaged area of the substrate coating for restoration (130); applying a restoration slurry (140); heat treating the substrate with the restoration slurry applied (150); applying a secondary coating or coatings (160); and finishing the outer surface of the restored portion of the substrate coating (170). While restoration coating technique 100 is shown beginning with operation 110, in other examples the technique 100 may begin at various points in restoration coating technique 100. Further, various examples may include some or all of the operations illustrated in FIG. 1, and the operations may or may not be performed in the illustrated order.

Restoration coating technique 100 may include providing an in-service component (110). An in-service or in-situ component may be one that is not removed from an assembly or from a normal operating configuration. An in-service component may remain in place during a coating restoration technique in some examples of the present disclosure. In some examples, the component may be part of a high temperature mechanical system. In some examples, the component may be a gas turbine hot section component such as, but not limited to, a turbine blade, a turbine vane, a blade track, or a combustion liner. Operational limitations for hot section components may be related to the service temperature of the component materials. Materials with higher operating temperatures as well as various coatings may be applied to gas turbine hot section components achieve higher operating temperatures within the mechanical system.

The component may include a substrate material. The substrate, selected for high temperature mechanical, physical, and/or chemical properties, may include various materials such as, but not limited to, superalloys, Si-containing ceramics, silicon carbide, silicon nitride, composites having a SiC or $Si_3N_4$ matrix, silicon oxynitride, silicon aluminum oxynitride, a Si-containing metal alloy, molybdenum-silicon alloys, niobium-silicon alloys, and oxide-oxide ceramics. In some examples, the substrate of the component may include a ceramic matrix composite, which includes a ceramic matrix reinforced with ceramic fibers, whiskers, platelets, or chopped or continuous fibers.

Restoration coating technique 100 may further include identifying a damaged area in the surface of the component. In some examples, the surface of the component may include a substrate with a protective coating applied. In some examples, the surface can include a substrate having an environmental barrier coating (EBC). Protective coatings, such as EBCs for example, may be susceptible to damage from impact by foreign objects in applications such as gas turbine engines. The resulting damage to the coating may require repair or replacement before the underlying substrate is damaged by the combustion environment. In some examples, an EBC is applied to a silicon-based ceramic matrix composite (CMC) substrate to prevent recession of the CMC in a combustion environment of a gas turbine engine due to the volatilization of silica scale by water vapor. Damage may be experienced on any portion of a component or system where a coating has been compromised and the substrate surface exposed to damaging conditions. The size of the damage in area and depth can range from microscopic to macroscopic on a scale of inches. In some examples, the damaged area can also vary in area and depth from one portion of the damaged area to another. The size and location of a damaged area may influence further actions relating to restoration or repair of the component.

Restoration coating technique 100 also may include determining whether the damaged area in the surface of the component can be restored using restoration coating technique 100 (125). If the damaged area cannot be restored, restoration coating technique 100 may proceed to providing another component (110) (the "No" branch of decision block (125)). If the damaged area can be restored using restoration coating technique 100, restoration coating technique 100 proceed (the "Yes" branch of decision block (125)).

In some examples, restoration coating technique 100 may include preparing the surface for restoration (130). Preparing the surface for restoration (130) may include different operations based on the location, size, and/or depth of the damaged area; the coating on the substrate; and/or substrate materials. For example, preparing the surface for restoration (130) may include removing damaged material from the surface (132), cleaning the surface (134), roughening the surface (136), masking the surface (138), and combinations thereof.

In some examples, removing the damaged area (132) results in exposing the substrate or other layers in a coating system. Other layers in a coating system can include, alone or in combination, a bond layer, an intermediate layer, a protective layer, a top coat, or the like. The extent of the exposure in a particular example can depend on the extent of the damage to the various coatings or layers. Restoration coating technique 100 may be used restore the coating of a component regardless of the number and type of layers damaged, including the substrate.

Cleaning the surface (134) may include removing contaminants from the exposed surface or surfaces. Cleaning techniques may include, for example, a solvent wash-type cleaning technique, a mechanical abrasion-type cleaning technique, and combinations thereof. In some examples, cleaning the surface (134) may remove contaminants without removing uncompromised coating and/or substrate material.

Roughening the exposed surface (136) may include, for example, using abrasive papers or pads, grit blasting, chemical etching, and combinations thereof to roughen the exposed surface. Roughening of an exposed surface (136) may improve the ability of the restoration coating to adhere to the surface compared to an surface that has not been roughened. The type and extent of roughening of the exposed surface may be determined in response to the coating and substrate material and the size and location of the damaged area.

Masking portions of the component surface (138) may include masking portions of the component that are undamaged, leaving the damaged area uncovered. Whether coating restoration technique 100 includes masking portions of the component surface (138) and the extent and type of masking, if used, may depend upon the type of restoration coating material, how restoration coating material is applied, the geometry of the damaged or undamaged areas, the location of the damaged area, etc.

After preparing the surface or preparing the surface, restoration coating technique 100 further includes applying a restoration slurry (140). In some examples, restoration coating technique 100 includes combining the constituents of the restoration slurry (142). Selection of the constituents of the restoration slurry may depend on the type of substrate being coated, the type of coating being restored, operational environmental factors, slurry application processes available, and the like. The restoration slurry may include at least one liquid carrier, at least one restoration coating material, a binder, a dispersant, a fugitive material, and combinations thereof. As part of the restoration slurry, the at least one liquid carrier may include an organic solvent, water, etc.

The at least one restoration coating material may include at least one of mullite ($3Al_2O_3.2SiO_2$ or $2Al_2O_3.SiO_2$), a rare earth silicate, a rare earth oxide, alumina, zirconia, hafnia, $ZrSiO_4$, $HfSiO_4$, $TiO_2$, $Ta_2O_5$, carbon, boron oxide, borosilicate, alkali metal oxide, alkali earth metal oxide, silicon, silicon alloy, aluminum, boron, germanium, silica, barium strontium aluminosilicate (BSAS), barium aluminosilicate (BAS), calcium aluminosilicate (CAS), magnesium aluminosilicate (MAS), lithium aluminosilicate (LAS). In some examples, a rare earth oxide may include an oxide of at least one of Lu, Yb, Tm, Er, Ho, Dy, Gd, Tb, Eu, Sm, Pm, Nd, Pr, Ce, La, Y and Sc. Similarly, a rare earth silicate may include a monosilicate or disilicate of at least one of Lu, Yb, Tm, Er, Ho, Dy, Gd, Tb, Eu, Sm, Pm, Nd, Pr, Ce, La, Y, and Sc. In some examples, at least one of a rare earth silicate, a rare earth oxide, alumina, zirconia, hafnia, $ZrSiO_4$, $HfSiO_4$, $TiO_2$, $Ta_2O_5$, carbon, boron oxide, borosilicate, alkali metal oxide, alkali earth metal oxide, silicon, silicon alloy, aluminum, boron, germanium, silica, BSAS, BAS, CAS, MAS, LAS, with or without mullite, may react after being applied to the damaged portion (140). The reaction may form a glass phase, such as a rare earth alumino silicate glass, an alkali alumino silicate glass, an alkali earth alumino silicate glass, a carbide, a nitride, a borosilicate glass, or the like.

In some examples, the restoration slurry may include a binder selected for a high carbon char yield, and which may bind other slurry components at very high temperatures and potentially react with slurry components. In some examples, the restoration slurry may include carbon added in the form of powders, nanotubes, whiskers, or chopped fibers. In some examples, the restoration slurry may include pre-ceramic polymers added to create oxides, carbides, nitrides and/or borides of Si, Ge, Ti, V, Cr, Zr, Nb, Mo, Hf, W, Ta, Re, B, and Al, for example. Pre-ceramic materials in the restoration slurry may provide bonding enhancement by binding other slurry components until reactions are complete, or may supply reactants for conversion.

In some examples, the restoration slurry may include a fugitive material. The fugitive material may include a polymer or graphite, and may be added to the slurry to fabricate a porous coating, such as a coating suitable to repair abradable coatings. The fugitive material may evaporate or burn off during subsequent operations, such as heat treating, leaving a porous coating.

The restoration slurry may be applied (140) using various techniques, including, for example dipping, painting, and spraying. In some examples, the restoration slurry may be applied (140) using a non-line-of-sight process. The restoration slurry may be applied in-situ or on-site, or at another location, e.g., after removing the component from its assembly.

In some examples, restoration coating technique 100 may include heat treating the coated component (150). In other examples, restoration coating technique 100 may not include a controlled heat treating but may rely on the in-service operating conditions of the component to heat treat the restored coating. Some examples that include heat treating the coated component (150) also may include drying the restoration slurry after the restoration slurry is applied to the damaged area of the surface (152). The restoration slurry may be dried (152) using active or passive techniques. For example, drying of the restoration slurry (152) may be a natural occurrence of restoration coating technique 100. In some examples, the component can be dried (152) to facilitate the formation of a coating or to cause reactions such as removing a substantial portion of the solvent or liquid carrier in the restoration slurry. In some examples, the restoration slurry may be dried (152) under a vacuum or in air. In some examples, the restoration slurry may be dried (152) at temperatures up to about 300° C.

Heat treating the coated component (150) may facilitate processes such as, but not limited to, sintering and reactions in the restoration slurry between the at least one rare earth silicate, rare earth oxide, alumina, zirconia, hafnia, $ZrSiO_4$, $HfSiO_4$, $TiO_2$, $Ta_2O_5$, carbon, boron oxide, borosilicate, alkali metal oxide, alkali earth metal oxide, silicon, silicon alloy, aluminum, boron, germanium, silica, BSAS, BAS, CAS, MAS, and/or LAS, with or without mullite. In some examples, heat treating the coated component (150) may form a glass phase with a glass-ceramic. In some examples, a glass phase, such as a rare earth alumino silicate glass, an alkali alumino silicate glass, an alkali earth alumino silicate glass, a carbide, a nitride, a borosilicate glass, or the like, can be formed during heat treatment of the coated component (15). Glass ceramics may include BSAS, BAS, SAS, MAS, MAS, or CAS, for example.

In some examples, heat treating the coated component (150) may be performed at temperatures up to 1500° C. In some examples, heat treating the coated component (150) may be performed in an atmosphere such as, for example, air, vacuum, an inert atmosphere (Ar or He for example), a reducing atmosphere such as $H_2$, an ammonia atmosphere, an $N_2$ atmosphere to supply nitrogen for reaction, a methane atmosphere to supply carbon, or the like. In some examples, heat treating the coated component (150) may be performed for up to approximately one hour to up to approximately 10 hours. The heat treatment may be localized, such as from a heat lamp, high intensity quartz lamp, or open flame such as oxyacetylene torch, for example, to confine the heat treatment to the damaged area coated with the restoration slurry-based coating. In some examples, heat treating the coated component (150) may be a multi-step process with various parameters for heat treating. In some examples, heat treating the coated component (150) may occur during the next normal operating cycle of the component.

In some examples, restoration coating technique 100 may be complete following after applying the restoration slurry (140) or heat treating the coated component (150). In other examples, restoration coating technique may continue with applying a secondary coating (160) and/or finishing the surface of the restored coating (170). Applying a secondary coating or coatings (160) may include, for example, applying a top coat over the restoration slurry coating. The top coat can be an EBC, a thermal barrier coating (TBC) or a combination of an EBC and a TBC. In some examples, the top coat can be applied with the same process used to apply the restoration slurry coating (140). The top coat slurry composition can be tailored to make the top coat suitable as an EBC or TBC. In some examples, parameters for tailoring a top coat slurry composition can include water vapor stability, high temperature capability, low thermal conductivity, and the like. In some examples, a higher proportion of rare earth silicate, zirconia, or hafnia can be applied in the top coat to facilitate these properties.

In some examples, restoration coating technique 100 may include a finishing process (170). The finishing process (170) may be applied in response to surface properties of the restoration slurry coating and/or the top coat (if present). Surface properties can affect the air flow adjacent to components in gas turbine engines, for example. In some examples, the surface can be smooth; in other examples, the surface can be textured. In some examples, the finishing process (170) may smooth the transition between the restored slurry coating in the damaged area of the surface and the original undamaged area of the surface.

Figure 2:
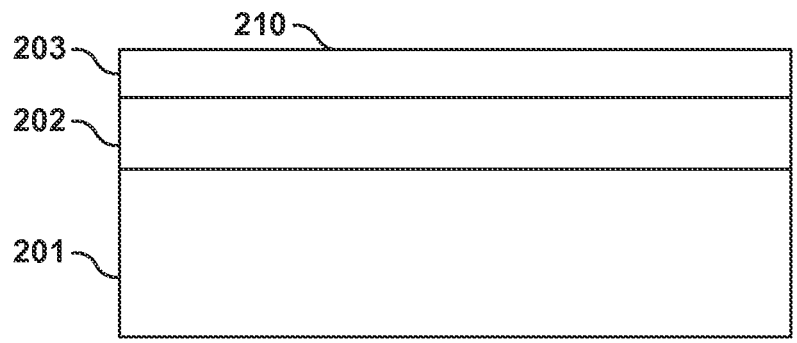
FIG. 2 is a schematic diagram of an example intact coating.

FIGS. 2-5 illustrate a surface on a substrate with two coating layers which undergoes the restoration coating technique 100 of FIG. 1. Intact surface 210 of FIG. 2 is shown including a substrate 201, an intermediate layer 202, and a protective coating 203. In some examples, intact surface 210 may include one or more layers of various coating materials on a substrate 201. The number and type of coatings may depend on substrate 201, the operating environment or other design requirements, for example.

Figure 3:
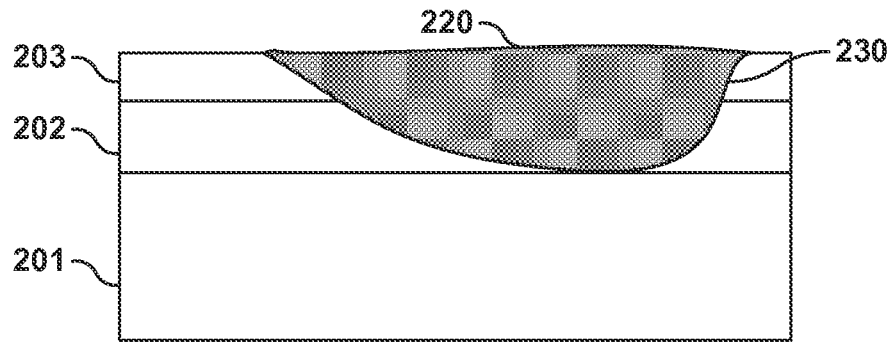
FIG. 3 is a schematic diagram of an example damaged coating.

FIG. 3 shows a damaged surface 220 including a damaged area 230 occupying portions of protective coating 203 and intermediate layer 202. Coating damage may extend from just below damaged surface 220, into protective coating 203, through protective coating 203 into intermediate coating 202, and through all layers up to or into substrate 201, for example. The extent of damaged area 230 may depend on parameters such, as but not limited to, the component materials, the operating environment, and the time before discovery. Damaged area 230 of FIG. 3 extends into protective coating 203 in one portion, through protective coating 203 into intermediate layer 202 in another portion, and through all layers to substrate 201 in yet another portion.

Figure 4:
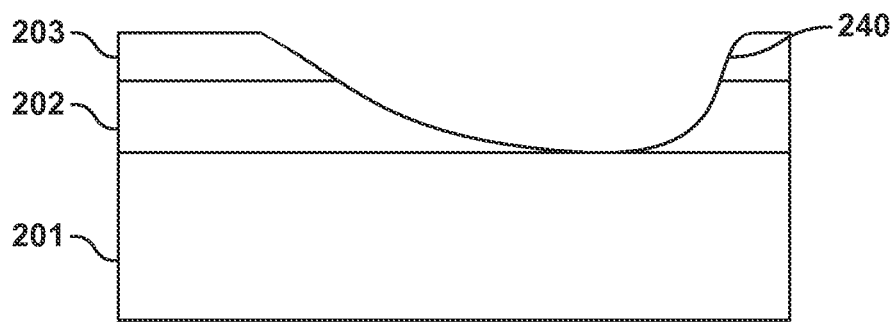
FIG. 4 is a schematic diagram of an example exposed coating.

Once damaged area 230 on a component is identified (120), a restoration technique such as restoration coating technique 100 of FIG. 1 may be applied. As described above, preparing the component for restoration (130) can include removal of damaged material (132) and cleaning of damaged area 230 (134). The resulting prepared surface of one example is shown in FIG. 4 to include an exposed surface area 240. Exposed surface area 240 includes exposed intermediate layer 202 in one portion and substrate 201 in another portion. Other surface preparation techniques may be applied such as roughening (136) and masking (138), for example.

Figure 5:
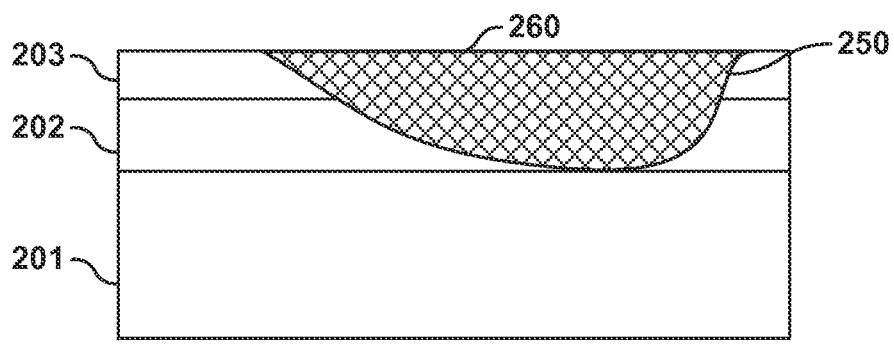
FIG. 5 is a schematic representation of an example restoration coating resulting from the example restoration coating technique illustrated in FIG. 1.

Following preparation of exposed surface area 240, a restoration slurry may be applied (140) and subjected to processes such as drying (152) and/or heat treating (150), for example, to form a restored layer 250, as shown in FIG. 5. Multiple applications of the restoration slurry and related processes may be performed to form restored layer 250. Restored layer 250 may be applied over substrate 201, intermediate layer 202 and protective coating 203. An outer surface 260 of restored layer 250 may be subjected to a finishing process (170) to provide a proper surface for the restored portion of the component.

Following restoration coating technique 100 in forming restored layer 250 to replace damaged area 230, a component can be returned to an operation status. In an operation status, the component can encounter the high temperatures and forces of a high temperature mechanical system, for example. In some examples, the restoration coating can be further conditioned by the next normal operating cycle of the system.

One aspect of the present application is a method including identifying a damage area of an in-service component having a substrate coating; applying a restoration slurry in the damage area; and drying the restoration slurry. Various features of this aspect include providing a liquid carrier, a restoration coating material, and a binder to form the restoration slurry where providing can further include a fugitive material; preparing the substrate coating where preparing the substrate coating can further include masking around the damage area to protect a portion of the substrate coating not within the damage area; heat-treating the restoration slurry; applying a secondary coating to the substrate coating within the damage area and where applying includes selectively applying to the damaged area with respect to an area adjacent the damaged area.

Another aspect of the present application is a method including removing a damaged area of a substrate coating to reveal an exposed surface; cleaning the exposed surface; roughening the exposed surface; applying a restoration slurry to the exposed surface; and heat treating the restoration slurry to form a restored portion of the substrate coating. Various features of this aspect include providing a liquid carrier, a restoration coating material, and a binder to form the restoration slurry where providing can further include a fugitive material; and finishing an outer surface of the substrate coating including the restored portion. Further features of heat treating include drying the restoration slurry and forming a glass phase in the restored portion.

Yet another aspect of the present application is a method including providing an in-service component having a ceramic matrix composite coating; identifying a damage area in the ceramic matrix composite coating; preparing the ceramic matrix composite coating, including: removing a damaged area of the ceramic matrix composite coating to reveal an exposed surface; cleaning the exposed surface; and roughening the exposed surface; providing a liquid carrier, a restoration coating material, a fugitive material and a binder to form a restoration slurry; applying the restoration slurry to the exposed surface in the damage area; drying the restoration slurry; and heat treating the dried restoration slurry to form a restored portion of the ceramic matrix composite coating. Various features of this aspect include applying a secondary coating to the ceramic matrix composite coating within the damage area and finishing an outer surface of the ceramic matrix composite coating including the restored portion. Further features of this aspect include preparing the ceramic matrix composite coating by masking around the damage area to protect an undamaged portion of the ceramic matrix composite coating not within the damage area; selectively applying the restoration slurry to the damaged area with respect to an area adjacent the damaged area; and heat treating by forming a glass phase in the restored portion.

While the coating restoration technique has been illustrated and described in detail in the drawings and foregoing description, the same is to be considered as illustrative and not restrictive in character, it being understood that only some examples have been shown and described, and that all changes and modifications that come within the scope of the following claims are desired to be protected.

It should be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    identifying a damaged area in an environmental barrier coating of an in-service component;
    applying a restoration slurry to the damaged area of the environmental barrier coating, wherein the restoration slurry comprises a liquid carrier and a restoration coating material, and wherein the restoration coating material comprises at least two of mullite, a rare earth silicate, a rare earth oxide, alumina, zirconia, hafnia, $ZrSiO_4$, $HfSiO_4$, $TiO_2$, $Ta_2O_5$ carbon, boron oxide, borosilicate, alkali metal oxide, alkali earth metal oxide, silicon, silicon alloy, aluminum, boron, germanium, silica, barium strontium aluminosilicate, barium aluminosilicate, calcium aluminosilicate, magnesium aluminosilicate, or lithium aluminosilicate;
    drying the restoration slurry to form a dried restoration slurry; and
    heat treating the dried restoration slurry to cause a reaction between the at least two of mullite, the rare earth silicate, the rare earth oxide, alumina, zirconia, hafnia, $ZrSiO_4$, $HfSiO_4$, $TiO_2$, $Ta_2O_5$, carbon, boron oxide, borosilicate, alkali metal oxide, alkali earth metal oxide, silicon, silicon alloy, aluminum, boron, germanium, silica, barium strontium aluminosilicate, barium aluminosilicate, calcium aluminosilicate, magnesium aluminosilicate, or lithium aluminosilicate to form a restored portion of the environmental barrier coating comprising a glass phase.

2. The method of claim 1, further comprising preparing an exposed surface of the environmental barrier coating.

3. The method of claim 2, wherein preparing the environmental barrier coating, includes: removing a damaged area of the environmental barrier coating to reveal the exposed surface.

4. The method of claim 2, wherein preparing the environmental barrier coating comprises cleaning the exposed surface.

5. The method of any of claim 2, further comprising roughening the exposed surface.

6. The method of any of claim 2, wherein preparing the exposed surface of the environmental barrier coating further comprises masking around the damaged area to protect an adjacent undamaged portion of the environmental barrier coating not within the damaged area.

7. The method of any of claim 1, wherein applying the restoration slurry includes selectively applying the restoration slurry to the damaged area with respect to an area adjacent the damaged area.

8. The method of any of claim 1, further comprising applying a secondary coating to the environmental barrier coating within the damaged area after heat treating the dried restoration slurry.

9. The method of any of claim 1, further comprising finishing an outer surface of the environmental barrier coating including the restored portion.

10. The method of any of claim 1, wherein heat treating the dried restoration slurry causes a reaction between constituents of the restored portion to form a glass phase in the restored portion.

11. The method of any of claim 1, further comprising leaving the in-service component as part of an assembly of which the in-service component is a part throughout method.

12. The method of any of claim 1, wherein the restoration slurry further comprises a fugitive material, and wherein heat treating the dried restoration slurry evaporates or burns off the fugitive material evaporates to form porosity in the restored portion of the environmental barrier coating.

13. The method of any of claim 1, wherein the restoration slurry further comprises a pre-ceramic polymer.

* * * * *